United States Patent
Ishizaka et al.

(10) Patent No.: US 7,030,910 B2
(45) Date of Patent: Apr. 18, 2006

(54) WIRELESS CAMERA

(75) Inventors: Kazuo Ishizaka, Kanagawa (JP); Hiroshi Kosugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 10/129,202

(22) PCT Filed: Sep. 7, 2001

(86) PCT No.: PCT/JP01/07801

§ 371 (c)(1),
(2), (4) Date: Sep. 26, 2002

(87) PCT Pub. No.: WO02/21829

PCT Pub. Date: Mar. 14, 2002

(65) Prior Publication Data

US 2003/0107655 A1   Jun. 12, 2003

(30) Foreign Application Priority Data

Sep. 7, 2000 (JP) ............................. 2000-272241

(51) Int. Cl.
*H04N 5/232* (2006.01)

(52) U.S. Cl. .................................................. 348/211.2
(58) Field of Classification Search ............ 348/14.02, 348/211.1, 211.2; 370/203, 208
See application file for complete search history.

(56) References Cited

U.S. PATENT DOCUMENTS

| 5,584,070 A | * | 12/1996 | Harris et al. ............... 340/7.54 |
| 6,009,336 A | * | 12/1999 | Harris et al. ............... 455/566 |
| 6,439,919 B1 | * | 8/2002 | Yasufuku et al. ........... 439/377 |
| 6,466,587 B1 | * | 10/2002 | Sugaya ....................... 370/468 |
| 6,522,352 B1 | * | 2/2003 | Strandwitz et al. ...... 348/211.2 |
| 6,744,823 B1 | * | 6/2004 | Kamemura et al. ......... 375/267 |
| 2002/0171737 A1 | * | 11/2002 | Tullis ......................... 348/143 |
| 2003/0031120 A1 | * | 2/2003 | Miyato et al. .............. 370/203 |
| 2003/0129999 A1 | * | 7/2003 | Ikeda et al. ................. 455/502 |
| 2003/0137964 A1 | * | 7/2003 | Suenaga et al. ............ 370/342 |

FOREIGN PATENT DOCUMENTS

| JP | 4-44777 | 4/1992 |
| JP | 5-48942 | 2/1993 |
| JP | 5-91072 | 12/1993 |
| JP | 7-250269 | 9/1995 |
| JP | 10-276343 | * 10/1998 |
| JP | 11-17994 | 1/1999 |
| JP | 11-55211 | 2/1999 |

* cited by examiner

*Primary Examiner*—David Ometz
*Assistant Examiner*—Hung Lam
(74) *Attorney, Agent, or Firm*—Frommer Lawrence & Haug LLP; William S. Frommer; Thomas F. Presson

(57) ABSTRACT

A wireless camera 11 includes a main body unit 16, encoding/transmission unit 17, and a battery unit 18. The encoding/transmission unit 17 includes a encoding/modulation unit 23 for performing MPEG 2 encoding and OFDM modulation, frequency converter 27, high-frequency amplifier 28, and a transmission antenna 19. The main body unit 16, encoding/transmission unit 17, and battery unit 18 are unitedly configured.

3 Claims, 13 Drawing Sheets

WIRELESS CAMERA

TECHNICAL FIELD

The present invention relates to a wireless camera for use in a relaying from the spot for television broadcasting.

BACKGROUND ART

Conventionally, wireless cameras have been used to perform a relaying from the spot for television broadcasting such as news programs, sports programs, and various event programs. When such a wireless camera is used, video signals and audio signals picked up and gathered by the wireless camera are transmitted to a base relay station such as a relay car using ground waves employing radio transmission. Thus, when such a wireless camera is used, since it is not necessary to take time to arrange and remove cables, less labor is required as compared with a conventional camera which is connected to cables. Also, since the camera angle is spread and degree of freedom is increased, the mobility of a wireless camera is improved at the spot where a relaying for television broadcasting is performed.

Recently, in transmitting video signals and audio signals obtained by such a wireless camera, video signals and audio signals are digitized and modulated in the digital modulation manner.

On the other hand, in a relay system employing such a wireless camera, it is difficult to secure transmission quality under the fading environment caused by movement and multipath. So, it is necessary to secure a transmission path all the time in shooting a subject by making an assistant, other than an operator of a wireless camera body, operate transmitting apparatuses such as a transmitter and a transmission antenna which are separated from the wireless camera body.

DISCLOSURE OF THE INVENTION

Accordingly, the present invention has an object to overcome the above-mentioned drawbacks of the prior art by providing a wireless camera which can be operated by single operator with its mobility desirably secured.

The above object can be attained by providing a wireless camera, including pick up means, encoding means for encoding video signals picked up by the pick up means to generate transmission data of a predetermined encoding system, modulation means for orthogonal frequency-division-multiplex modulating the transmission data encoded by the encoding means, and transmission means for frequency-converting modulated signals generated by the modulation means into signals of a radio frequency band, and radiating frequency-converted signals via an antenna, wherein the pick up means, the encoding means, the modulation means, and the transmission means are housed in a housing or a unitable housing.

The wireless camera has the pick up means, the encoding means, the modulation means for performing orthogonal frequency-division-multiplex modulation, the transmission means, and the antenna housed in a housing or a unitable housing.

BEST MODE FOR CARRYING OUT THE INVENTION

A ground digital radio relay system (referred to as a radio relay system, hereinafter) to perform a relaying from the spot for television broadcasting such as news programs, sports programs, and various event programs will further be described below concerning the best modes for carrying out the present invention with reference to the accompanying drawings.

Figure 1:
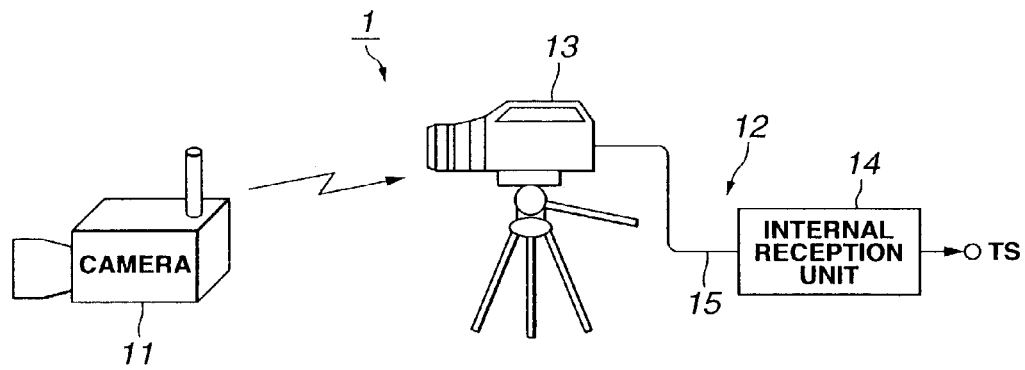
FIG. 1 shows the configuration of a radio relay system according to the present invention.

FIG. 1 shows the configuration of a radio relay system 1 according to the present invention.

As shown in FIG. 1, the radio relay system 1 includes a wireless camera 11 for shooting a subject, a reception relay station 12 for receiving transmission signals from the wireless camera 11. The reception relay station 12 includes an external reception unit 13, an internal reception unit 14, and a plurality of IF cables 15 which connects the external reception unit 13 and the internal reception unit 14.

The radio relay system 1 is used to perform a relaying from the spot for television broadcasting such as news programs, sports programs, and various event programs, and is a system adapted for transmitting video signals etc. of a video subject shot by the wireless camera 11 to the reception relay station 12 using ground waves employing radio transmission. In the radio relay system 1, the camera angle and shooting position are not restrained by cables etc. which connect the wireless camera 11 and the reception relay station 12. Also, the mobility of the wireless camera 11 is improved at the spot where a relaying for television broadcasting is performed.

In the radio relay system 1, transport streams conforming to the MPEG 2 Systems are employed as radio transmission signals from the wireless camera 11 to the reception relay station 12, and the OFDM (Orthogonal Frequency Division Multiplex) modulation manner is employed as a modulation manner. By generating and transmitting digitized transport streams from a video subject, it becomes possible to transmit video signals and audio signals of high quality with less S/N ratio deterioration as compared with the case in which signals of a video subject are transmitted in an analog manner. Also, when the OFDM modulation manner is employed, image deterioration caused by variation of electric field intensity due to reception in the moving state can be suppressed, and influence caused by multipath disturbance can also be suppressed. So, by employing the OFDM modulation manner, video signals and audio signals can be transmitted with high quality.

Next, the wireless camera 11 will be explained in detail.

Figure 2:
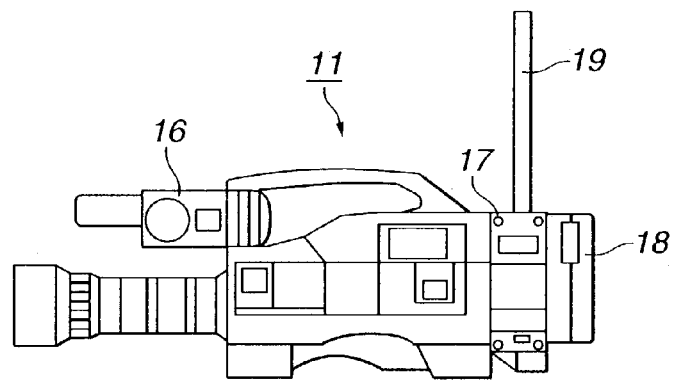
FIG. 2 shows a schematic view of a wireless camera which is used in the radio relay system.
Figure 3:
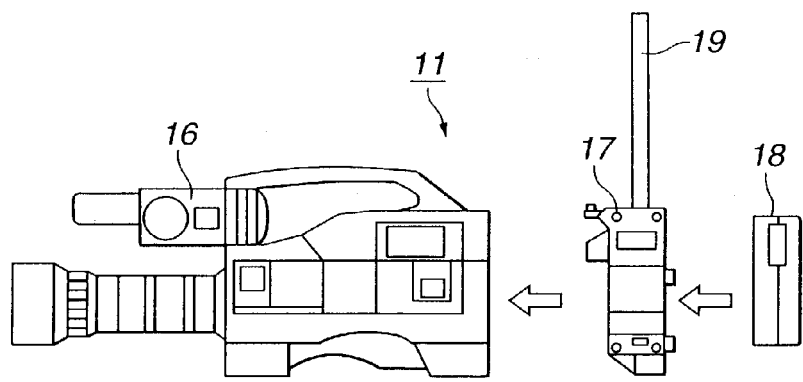
FIG. 3 shows a schematic view of the wireless camera whose main body unit, encoding/transmission unit, and battery unit are detached from each other.
Figure 4:
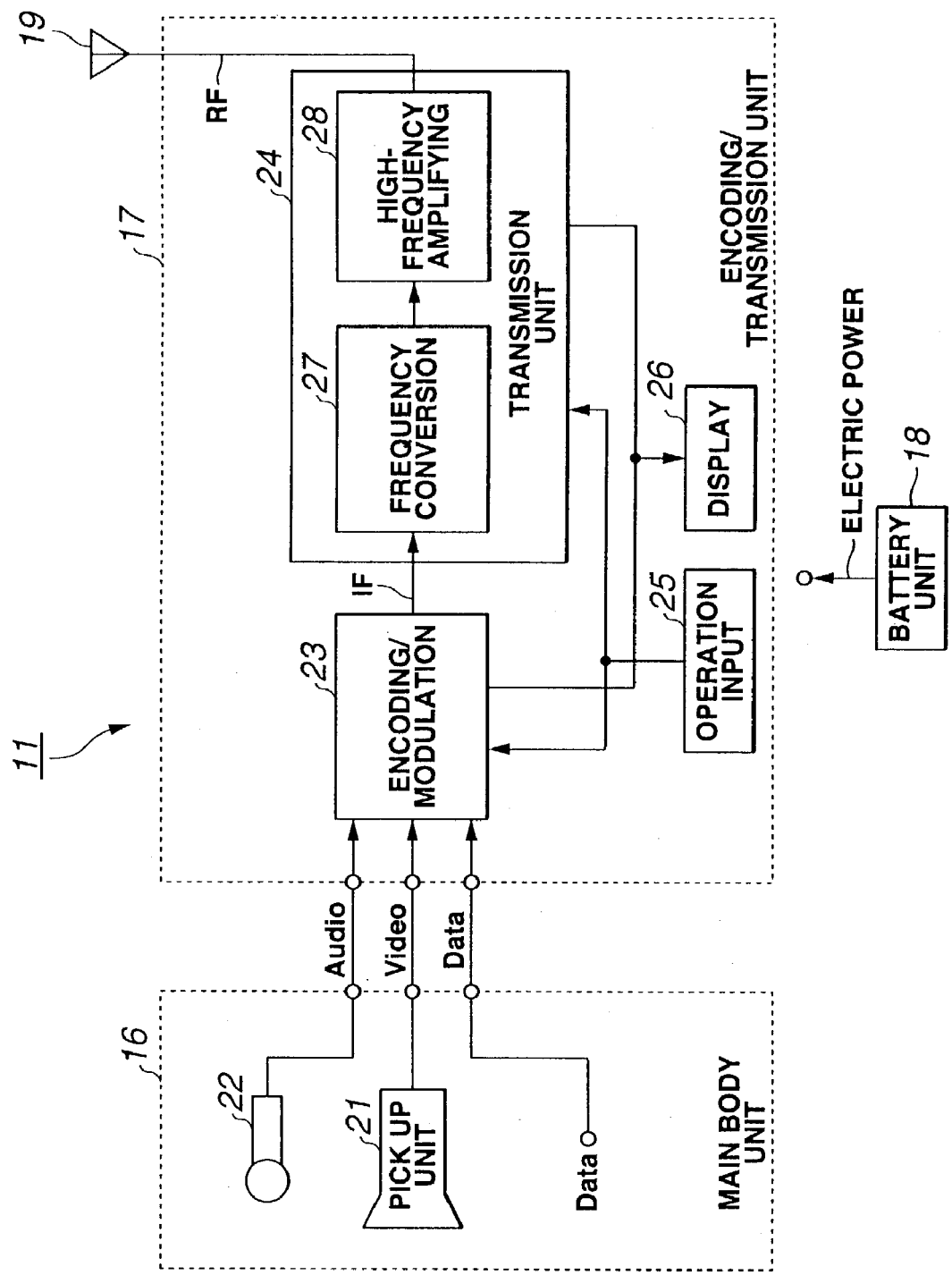
FIG. 4 shows a block diagram of the wireless camera.

FIG. 2 and FIG. 3 show schematic views of the wireless camera 11, while FIG. 4 shows a block diagram of the wireless camera 11.

As shown in FIG. 2, the wireless camera 11 includes a main body unit 16 provided with a pick up unit etc., an encoding/transmission unit 17 attached to the main body unit 16, and a battery unit 18 attached to the encoding/transmission unit 17. As shown in FIG. 3, the encoding/transmission unit 17 is removably attached to the main body unit 16, and the battery unit 18 is also removably attached to the encoding/transmission unit 17.

When the encoding/transmission unit 17 is attached to the main body unit 16, the encoding/transmission unit 17 is electrically connected to the main body unit 16. When the battery unit 18 is attached to the encoding/transmission unit 17, the main body unit 16 and the encoding/transmission unit 17 can be supplied with electric power by the battery unit 18. Also, the encoding/transmission unit 17 is provided with a transmission antenna 19. The transmission antenna 19 transmits video signals etc. picked up by the wireless camera 11 by employing radio transmission. The transmission antenna 19 is a non-directional antenna.

As shown in FIG. 4, the main body unit 16 includes a pick up unit 21 and a microphone 22.

The pick up unit 21 is composed of a pick up optical system, a CCD image sensor, an A/D converter, a camera signal processing unit, etc. The pick up unit 21 performs analog-to-digital conversion and timing processing for video signals picked up and converted to electric signals by the CCD image sensor to generate baseband digital video signals. The pick up unit 21 sends thus picked up and processed baseband digital video signals and synchronization signals of the digital video signals to the encoding/transmission unit 17.

The microphone 22 gathers audio speech or sound at respective relay spots, and digitize gathered audio signals to generate baseband digital audio signals. The microphone 22 sends thus gathered and processed baseband digital audio signals to the encoding/transmission unit 17.

The encoding/transmission unit 17 includes the transmission antenna 19, an encoding/modulation unit 23, a transmission unit 24, an operation input unit 25 which is operated by the user to perform input processing, a display unit 26 for displaying set up information etc. to the user. The transmission unit 24 in the encoding/transmission unit 17 includes a frequency converter 27 and a high-frequency amplifier 28.

The encoding/modulation unit 23 receives baseband digital video signals and baseband digital audio signals from the main body unit 16. Also, the encoding/modulation unit 23 receives predetermined data signals from the main body unit 16. The encoding/modulation unit 23 compresses and encodes digital video signals and digital audio signals based on the MPEG 2 Systems. Then, the encoding/modulation unit 23 multiplexes respective compressed data, other control data, etc. to generate transport streams conforming to the MPEG 2 Systems.

Furthermore, the encoding/modulation unit 23 performs predetermined transmission-line-encoding or OFDM frame construction for generated transport streams such as energy diffusion, RS encoding, convolutional interleaving, inner code encoding, bit interleaving, symbol interleaving, mapping corresponding to modulation manner, and insertion of predetermined pilot signals and null signals. Also, the encoding/modulation unit 23 performs OFDM modulation for transmission-line-encoded data streams such as orthogonal transformation for making 2,048 I, Q signals one symbol and performing IFFT (Inverse Fast Fourier Transform) operation to generate time-domain OFDM signals, guard interval addition for adding guard interval to time-domain OFDM signals by copying and pasting the latter half of one effective symbol to the first half thereof, orthogonal modulation for orthogonal-modulating time-domain OFDM signals to which guard interval is added to generate IF signals of an intermediate frequency band. Thus, the encoding/modulation unit 23 generates IF signals of an intermediate frequency band by performing the transmission-line-encoding and the OFDM modulation. The IF signals output from the encoding/modulation unit 23 is sent to the frequency converter 27 in the transmission unit 24.

The frequency converter 27 in the transmission unit 24 up-converts carrier frequency of IF signals to generate RF signals for radio transmission. Then, RF signals are sent to the high-frequency amplifier 28 in the transmission unit 24.

The high-frequency amplifier 28 in the transmission unit 24 high-frequency-amplifies RF signals, and the transmission antenna 19 radiates amplified RF signals.

Then, radio transmission signals from the wireless camera 11 are transmitted to the reception relay station 12.

As described above, the wireless camera 11 can transmit video signals of a video subject to the reception relay station 12 using ground waves employing radio transmission by encoding picked up signals of a video subject, generating transport streams, and then performing OFDM modulation for generated transport streams.

Next, referring to FIG. 5, internal circuit configuration of the encoding/modulation unit 23 in the encoding/transmission unit 17 will be explained in detail.

Figure 5:
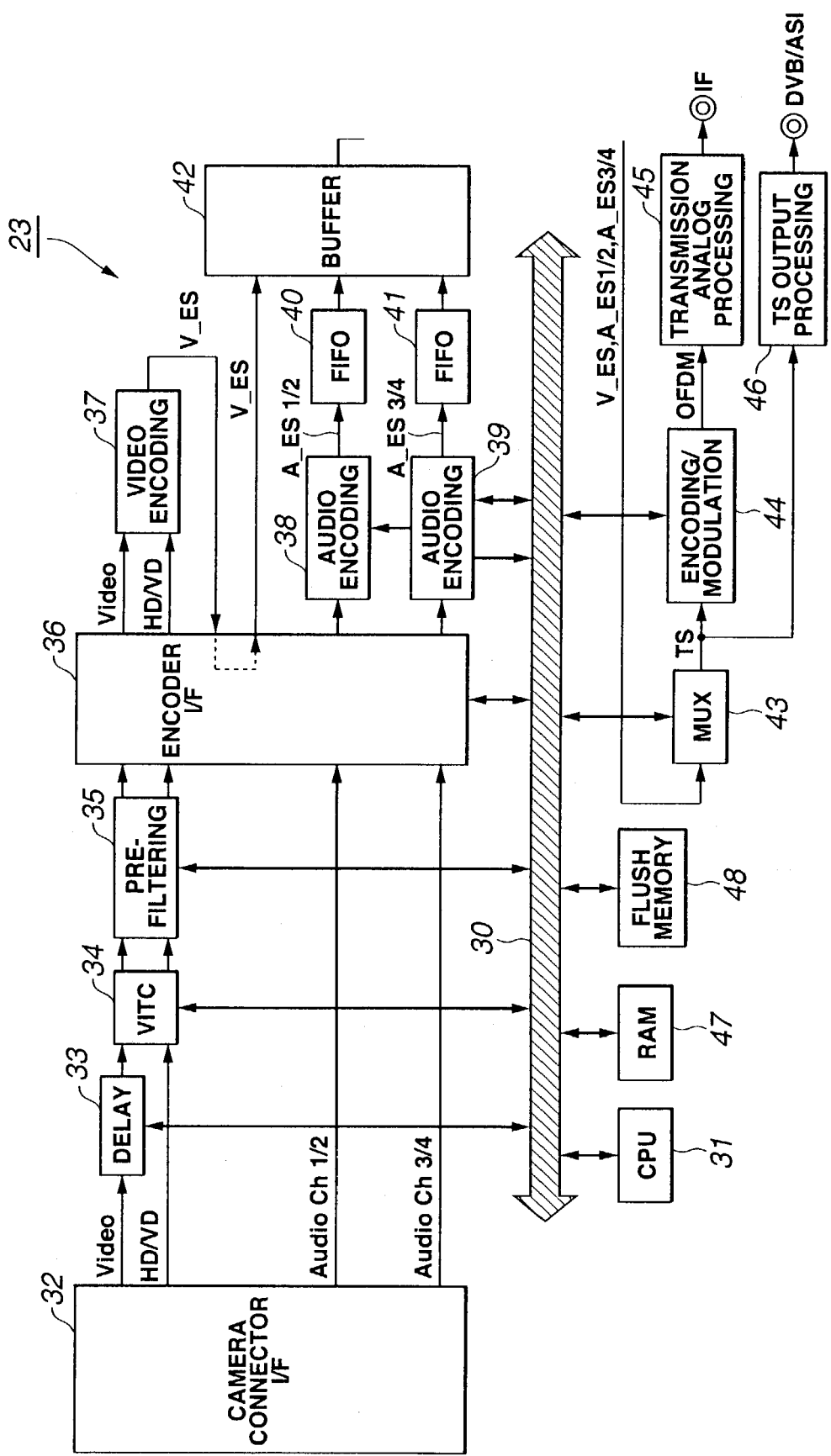
FIG. 5 shows a block diagram of an encoding/modulation unit in the encoding/transmission unit.

As shown in FIG. 5, the encoding/modulation unit 23 includes a CPU 31, a camera connector I/F (Interface) 32, a delay circuit 33, a VITC (Vertical Interface Time Code) circuit 34, a pre-filtering circuit 35, an encoder I/F circuit 36, a video encoding circuit 37, a first audio encoding circuit 38, a second audio encoding circuit 39, a first FIFO (First In First Out) circuit 40, a second FIFO circuit 41, a buffer circuit 42, an MUX (Multiplex) circuit 43, a transmission-line-encoding/OFDM modulation circuit 44, a transmission analog processing circuit 45, a TS output processing circuit 46, a RAM (Random Access Memory) 47, and a flush memory 48.

The CPU 31 is connected to the delay circuit 33, VITC circuit 34, pre-filtering circuit 35, encoder I/F circuit 36, video encoding circuit 37, first audio encoding circuit 38, second audio encoding circuit 39, MUX circuit 43, and transmission-line-encoding/OFDM modulation circuit 44, via a bus 30. The CPU 31 performs set up of various parameters and operation controlling for these respective circuits via the bus 30. Also, the CPU 31 is connected to the operation input unit 25 via the bus 30, and receives operation input information from the operation input unit 25 to perform set up of respective circuits in accordance with the operation input information. Also, the CPU 31 is connected to the display unit 26 via the bus 30, and performs controlling for displaying current set up contents of respective circuits. Also, the CPU 31 is connected to the RAM 47 and flush memory 48 via the bus 30. The RAM 47 is a volatile memory, in which data processed by the CPU 31 is stored. The flush memory 48 is a nonvolatile memory, in which parameters which are required to be preserved after a power switch is turned off is stored.

The camera connector I/F (Interface) 32 is an interface for making a connection with the main body unit 16. The encoding/modulation unit 23 receives baseband digital video signals (Video), synchronization signals thereof (HD/VD), and baseband digital audio signals (Audio), from the main body unit 16 via the camera connector I/F (Interface) 32. The encoding/modulation unit 23 can receive audio signals of four channels from the main body unit 16. When the audio signals of four channels from the main body unit 16 are received, audio signals of two channels are multiplexed and sent in the form of one audio stream. That is, the encoding/modulation unit 23 receives two audio streams from the main body unit 16. An audio stream including audio signals of channel 1 and those of channel 2 is referred to as first audio signals (Audio ch 1/2), while an audio stream including audio signals of channel 3 and those of channel 4 is referred to as second audio signals (Audio ch 3/4).

The baseband digital video signals (Video) from the main body unit 16 are sent to the delay circuit 33. Also, the synchronization signals of the digital video signals (HD/VD) are sent to the VITC circuit 34. The first and second audio signals (Audio ch 1/2, ch 3/4) from the main body unit 16 are sent to the encoder I/F circuit 36.

The delay circuit 33 delays the input baseband digital video signals by predetermined period. The baseband digital video signals delayed by the delay circuit 33 are sent to the VITC circuit 34.

The VITC circuit 34 extracts time code information included in the baseband digital video signals. The extracted time code information is sent to the CPU 31, and is used when time stamp for MPEG encoding processing is generated. The baseband digital video signals (Video), from which the time code information is extracted, and the synchronization signals of the digital video signals (HD/VD) are sent to the pre-filtering circuit 35.

The pre-filtering circuit 35 performs band limitation for video signals. The baseband digital video signals (Video) and the synchronization signals of the digital video signals (HD/VD) which have been processed under the band limitation of the pre-filtering circuit 35 are sent to the encoder I/F circuit 36.

The encoder I/F circuit 36 performs pre-processing of MPEG encoding such as adjustment of angle of view and audio encoding for the baseband digital video signals (Video) and the first and second audio signals (Audio ch 1/2, ch 3/4). The baseband digital video signals (Video) which are pre-processed by the encoder I/F circuit 36 are sent to the video encoding circuit 37. The first audio signals (Audio ch 1/2) which are pre-processed by the encoder I/F circuit 36 are sent to the first audio encoding circuit 38, while the second audio signals (Audio ch 3/4) which are pre-processed by the encoder I/F circuit 36 are sent to the second audio encoding circuit 39.

The video encoding circuit 37 performs video compression and encoding for the baseband digital video signals based on the MPEG 2 Systems. Video signals (video elementary stream (V_ES)) which are compressed and encoded by the video encoding circuit 37 are resent to the encoder I/F circuit 36, and are then sent to and stored in the buffer circuit 42 after passing through the encoder I/F circuit 36.

The first audio encoding circuit 38 performs audio compression and encoding for the first baseband digital audio signals based on the MPEG Systems. Audio signals (first audio elementary stream (A_ES 1/2)) which are compressed and encoded by the first audio encoding circuit 38 are sent to the first FIFO circuit 40, where data thereof is temporary delayed, and are then sent to and stored in the buffer circuit 42.

The second audio encoding circuit 39 performs audio compression and encoding for the second baseband digital audio signals based on the MPEG Systems. Audio signals (second audio elementary stream (A_ES 3/4)) which are compressed and encoded by the second audio encoding circuit 39 are sent to the second FIFO circuit 41, where data thereof is temporary delayed, and are then sent to and stored in the buffer circuit 42.

The MUX circuit 43 reads out the video elementary stream (V_ES) and the first and second audio elementary streams (A_ES 1/2, A_ES 3/4) from the buffer circuit 42, and packets data of these elementary streams to generate TS packets each being data unit. The MUX circuit 43 multiplexes the three elementary streams with the packet unit to generate transport streams conforming to the MPEG 2 Systems. Also, the MUX circuit 43 generates TS packets including transmission control information based on information supplied from the CPU 31 if necessary, and multiplexes the TS packets into the transport streams. Transport streams generated by the MUX circuit 43 are sent to the transmission-line-encoding/OFDM modulation circuit 44 or the TS output processing circuit 46.

The transmission-line-encoding/OFDM modulation circuit 44 performs transmission-line-encoding and OFDM modulation for input transport streams to generate IF signals. IF signals generated by the transmission-line-encoding/OFDM modulation circuit 44 is sent to the transmission analog processing circuit 45.

The transmission analog processing circuit 45 performs filtering and analog matching for input transmission-line-encoded and OFDM-modulated data streams sent from the transmission-line-encoding/OFDM modulation circuit 44. IF signals which are analog-processed by the transmission analog processing circuit 45 are sent to the frequency converter 27 in the transmission unit 24 via a coaxial cable, etc.

The TS output processing circuit 46 performs pull-up processing of power supply voltage for input transport streams sent from the MUX circuit 43 to generate transport streams conforming to the specification of the serial transmission format. Transport streams which have been processed under the pull-up processing of power supply voltage by the TS output processing circuit 46 are sent to the outside of the wireless camera 11 via a coaxial cable, etc. The TS output processing circuit 46 is an optional circuit which is used in transmitting picked up signals of the wireless camera 11 without employing radio broadcasting but employing wire broadcasting.

Next, referring to FIG. 6, configuration of the transmission-line-encoding/OFDM modulation circuit 44 in the encoding/modulation unit 23 will be explained in detail.

Figure 6:
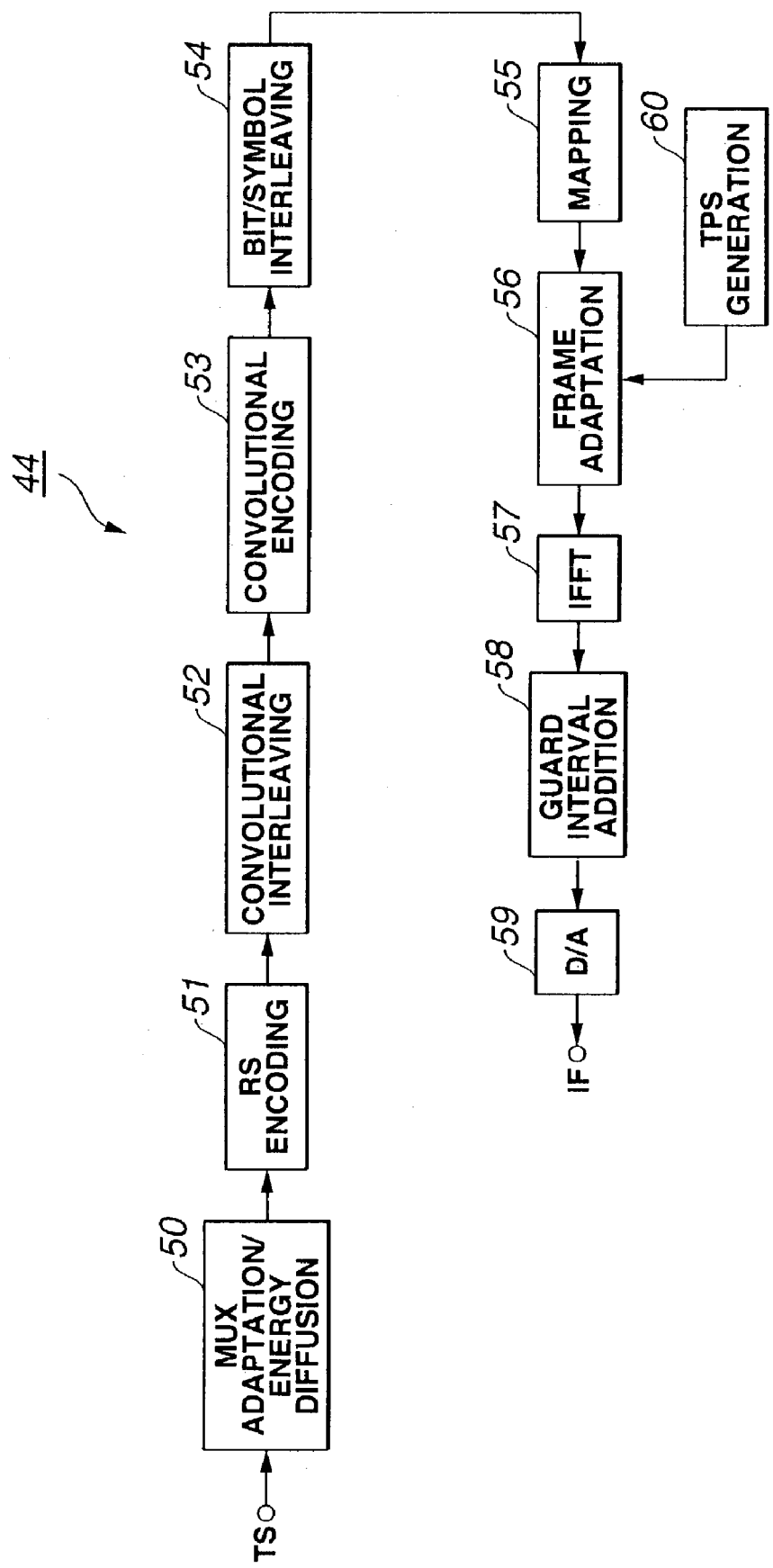
FIG. 6 shows a block diagram of a transmission-line-encoding/OFDM modulation circuit in the encoding/modulation unit.

As shown in FIG. 6, the transmission-line-encoding/OFDM modulation circuit 44 includes an MUX adaptation/energy diffusion circuit 50, a reed solomon encoder 51, a convolutional interleaving circuit 52, a convolutional encoder 53, a bit/symbol interleaving circuit 54, a mapping circuit 55, a frame adaptation circuit 56, an IFFT circuit 57, a guard interval addition circuit 58, a D/A converter 59, and a TPS generation circuit 60.

The transmission-line-encoding/OFDM modulation circuit 44 receives transport streams from the MUX circuit 43 arranged upstream thereof. Thus received transport streams are sent to the MUX adaptation/energy diffusion circuit 50 of the transmission-line-encoding/OFDM modulation circuit 44.

The MUX adaptation/energy diffusion circuit 50 performs bit inversion for synchronization byte of leading 1 byte of TS packets every 8 TS packets to correct the synchronization byte from 47h to B8h. At this time, the MUX adaptation/energy diffusion circuit 50 simultaneously initializes a shift-register for generating pseudorandom binary sequence (PRBS) which is used in performing energy diffusion every 8 TS packets by predetermined seed value (initial value). For example, the PRBS series is $(x^{15}+x^{14}+1)$, and seed value is 009Ah. The MUX adaptation/energy diffusion circuit 50 performs energy diffusion by operating exclusive OR of data of TS packets excluding synchronization byte (1 byte) and PRBS. Data series which have been processed under energy diffusion are sent to the reed solomon encoder 51.

The reed solomon encoder 51 performs reed solomon encoding for input data series, and adds parity of 16 bytes thereto every TS packet. Data series to which parity is added are sent to the convolutional interleaving circuit 52.

The convolutional interleaving circuit 52 performs convolutional interleaving for input data series. Data series which have been processed under convolutional interleaving are sent to the convolutional encoder 53.

The convolutional encoder 53 performs convolutional encoding using two encoders which are of G1=171 (Octal) and of G2=133 (Octal), and performs 2-bit encoding for 1-bit input data. In case punctured processing is performed, 2-bit output encoded data is punctured. Data series which have been processed under convolutional encoding are sent to the bit/symbol interleaving circuit 54.

The bit/symbol interleaving circuit 54 performs interleaving for frequency in OFDM symbol and performs interleaving for bits to be allocated to mapping points. Data series which have been processed under interleaving are sent to the mapping circuit 55.

The mapping circuit 55 divides data series on the basis of code length corresponding to modulation manner (for example, 6-bit code length in case of 64 QAM), and adds divided data series to predetermined mapping points. By thus allocating data series to mapping points, two-dimensional information composed of I, Q components is output. Data series of two-dimensional information are sent to the frame adaptation circuit 56.

The frame adaptation circuit 56 inserts predetermined pilot signals, transmission parameter signaling (TPS), and null signals sent from the TPS generation circuit 60 into mapped data series of two-dimensional information, or perform OFDM frame construction. Data series which have been processed under OFDM frame construction are sent to the IFFT circuit 57.

The IFFT circuit 57 makes 2,048 I, Q signals one OFDM symbol, and performs IFFT operation in one lot. Data series which have been processed under IFFT operation are sent to the guard interval addition circuit 58 every one effective symbol.

The guard interval addition circuit 58 adds guard interval to effective symbol by copying and pasting the latter quarter signal wave of one effective symbol output from the IFFT circuit 57 to the leading portion thereof. Data series to which guard interval is added are sent to the D/A converter 59.

The D/A converter 59 converts digital signals to analog signals, and outputs the converted signals as OFDM-modulated signals.

Thus generated OFDM-modulated signals are sent to the transmission analog processing circuit 45.

Next, configuration of the encoding/transmission unit 17 will be explained in detail.

Figure 7:
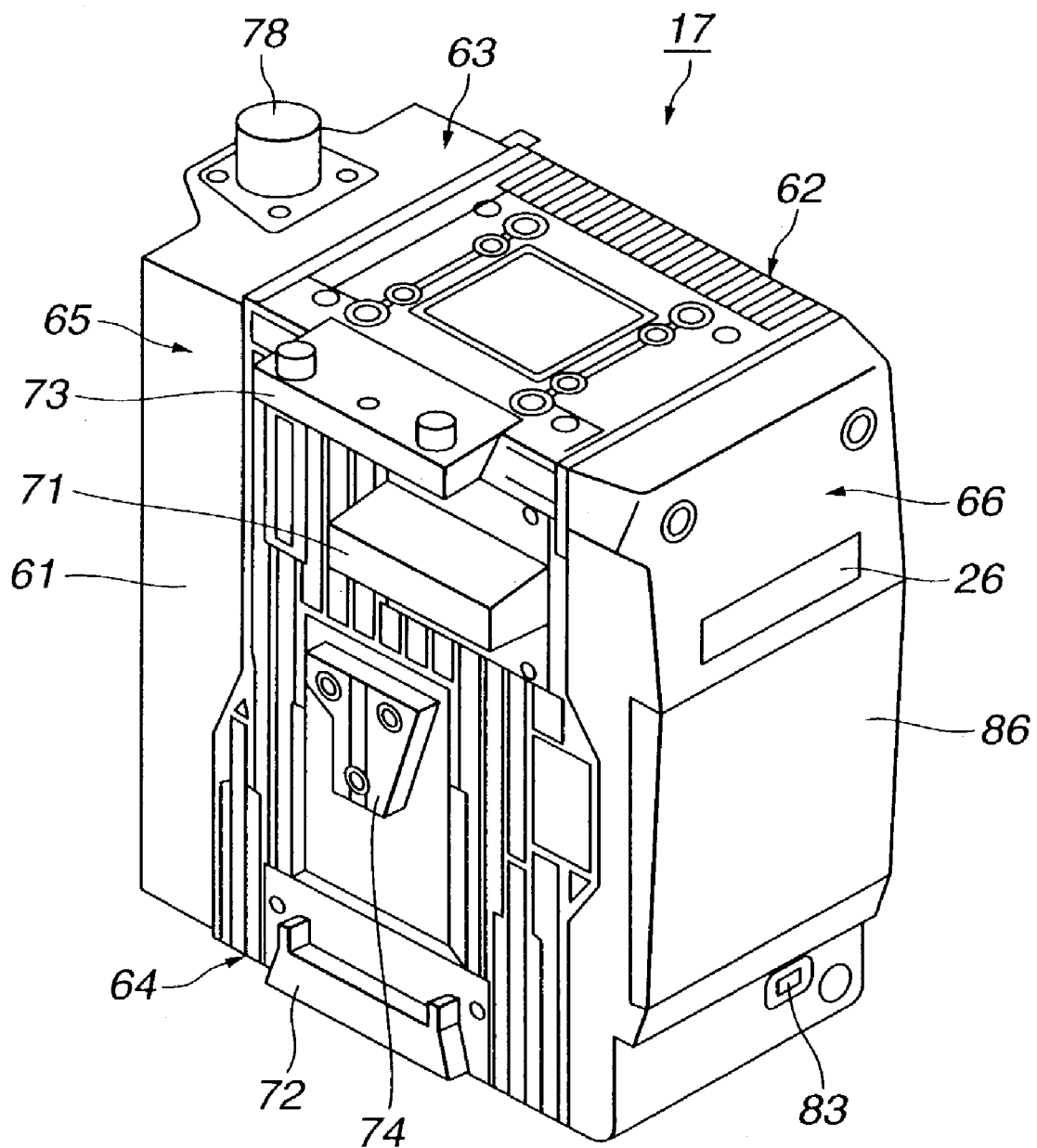
FIG. 7 shows a perspective view of the encoding/transmission unit.

FIG. 7 shows a perspective view of the encoding/transmission unit 17.

As shown, the encoding/transmission unit 17 is substantially of a rectangular solid. Of respective surfaces of the encoding/transmission unit 17, a surface to which the main body unit 16 is attached is a front surface 61, while a surface, which is the opposite of the front surface 61, to which the battery unit 18 is attached is a rear surface 62. A surface which faces upward when the main body unit 16 is attached to the encoding/transmission unit 17 is a top surface 63, while a surface which faces downward is a bottom surface 64. A surface which is located at the left side of the front surface 61 when viewed from the front surface 61 side is a left surface 65, while a surface which is located at the right side of the front surface 61 is a right surface 66.

Figure 8:
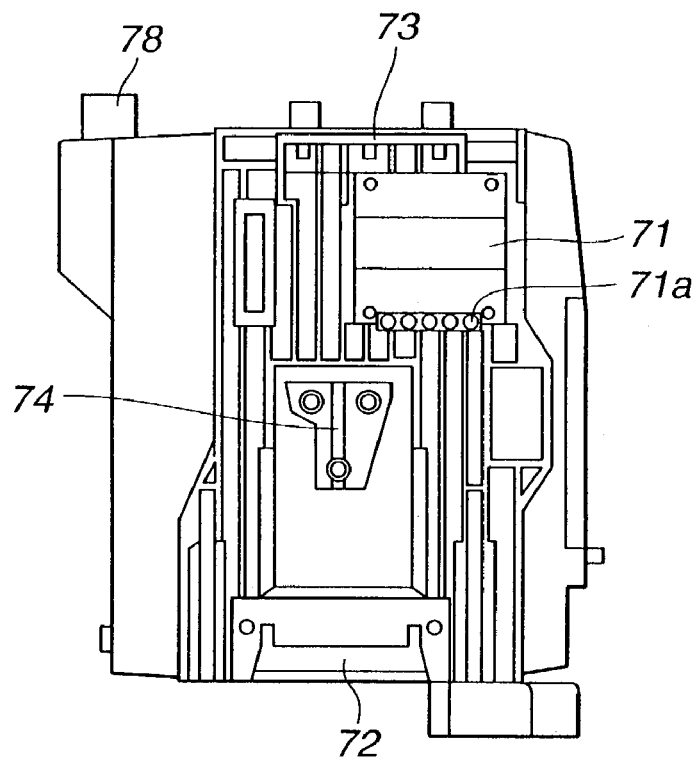
FIG. 8 shows a plan view of the encoding/transmission unit viewed from a front surface side.

FIG. 8 shows a plan view of the encoding/transmission unit 17 viewed from the front surface 61 side. The front surface 61 is provided with a connector unit 71 for making a connection with the main body unit 16, which has a connector 71a of, for example, 40 pins. The connector 71a is connected to a connection terminal of the main body unit 16. The connector 71a receives baseband digital video signals and baseband digital audio signals etc. from the main body unit 16. Also, the front surface 61 is provided with a main body side power supply output connector 72. DC power is supplied to the main body unit 16 via the main body power supply output connector 72. Also, the front surface 61 is provided with joint mechanisms 73, 74. The main body unit 16 and the encoding/transmission unit 17 are mechanically connected to each other by the joint mechanisms 73, 74.

Figure 9:
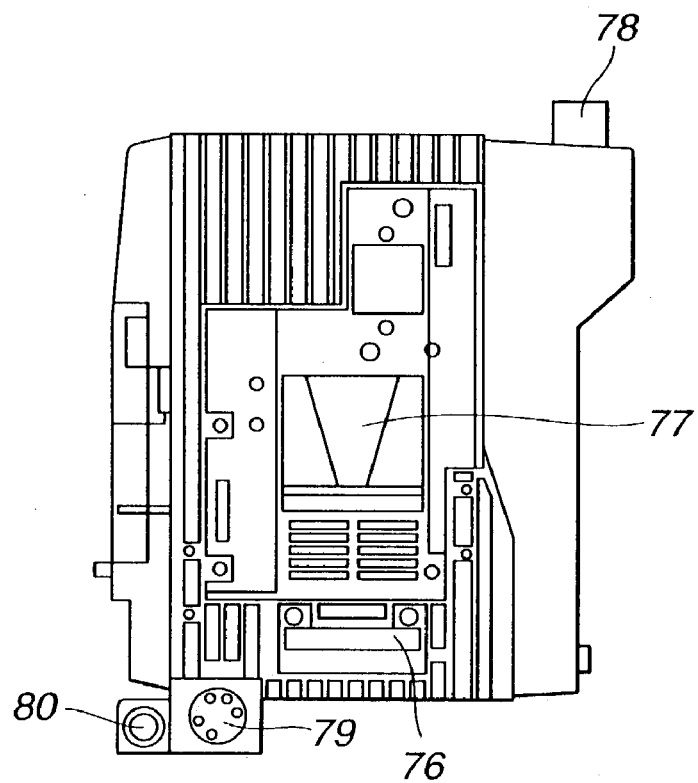
FIG. 9 shows a plan view of the encoding/transmission unit viewed from a rear surface side.

FIG. 9 shows a plan view of the encoding/transmission unit 17 viewed from the rear surface 62 side. The rear surface 62 is provided with a battery side power supply input connector 76. DC power is supplied to the encoding/transmission unit 17 from the battery unit 18 via the battery side power supply input connector 76. Also, the rear surface 62 is provided with a joint mechanism 77. The encoding/transmission unit 17 and the battery unit 18 are mechanically connected to each other by the joint mechanisms 77.

Figure 10:
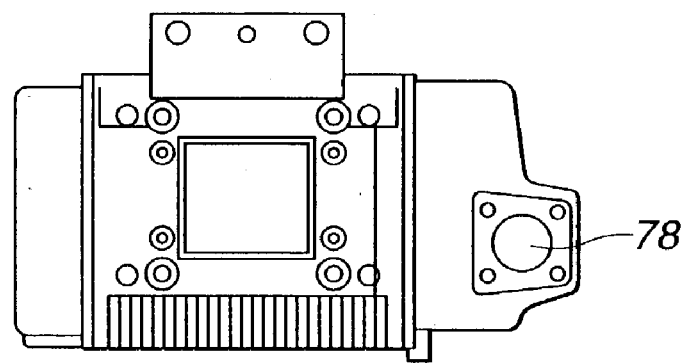
FIG. 10 shows a plan view of the encoding/transmission unit viewed from a top surface side.

FIG. 10 shows a plan view of the encoding/transmission unit 17 viewed from the top surface 63 side. The top surface 63 is provided with an N connector 78 for making a connection with an antenna. The transmission antenna 19 is removably connected to the N connector 78.

The bottom surface 64 is provided with an external power supply input terminal 79 to which DC power is supplied from an external DC power supply, and an external power supply output terminal 80 which supplies DC power to an external device.

Figure 11:
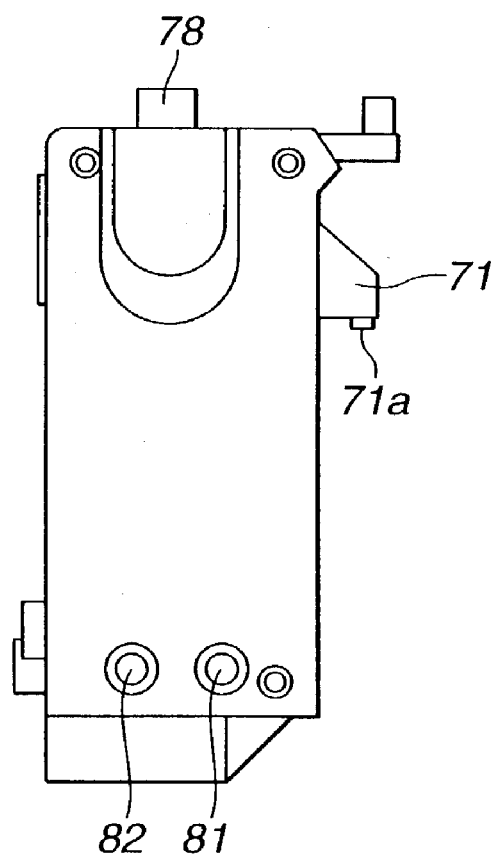
FIG. 11 shows a plan view of the encoding/transmission unit viewed from a left surface side.

FIG. 11 shows a plan view of the encoding/transmission unit 17 viewed from the left surface 65 side. The left surface 65 is provided with coaxial connectors 81, 82 for outputting transport streams.

Figure 12:
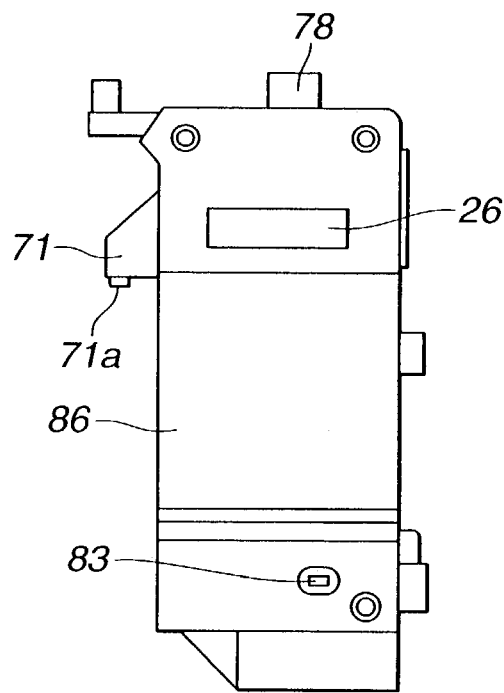
FIG. 12 shows a plan view of the encoding/transmission unit viewed from a right surface side with a panel cover thereof closed.
Figure 13:
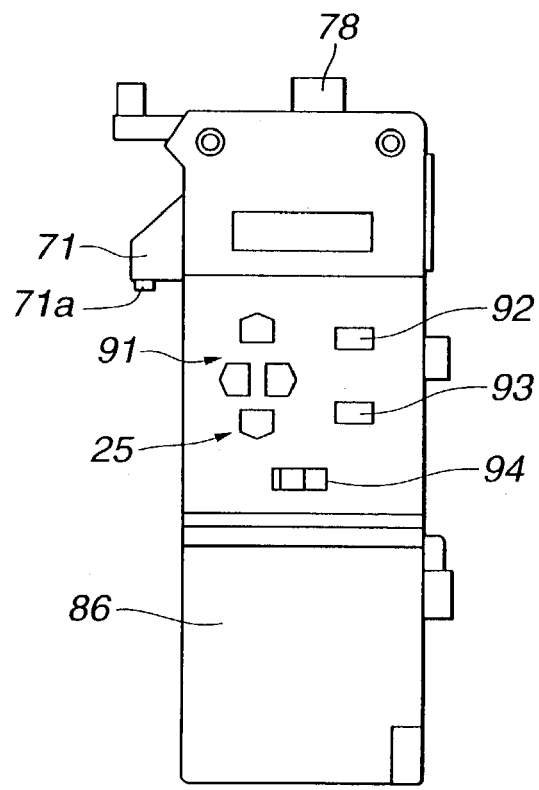
FIG. 13 shows a plan view of the encoding/transmission unit viewed from a right surface side with a panel cover thereof opened.

FIG. 12 and FIG. 13 show plan views of the encoding/transmission unit 17 viewed from the right surface 66 side. The right surface 66 is provided with a power switch 83 and a display unit 26. Also, the right surface 66 is provided with an operation input unit 25 which is used by the user in performing various set up for the wireless camera 11. The operation input unit 25 is covered by a panel cover 86 for preventing mis-operation when shooting a subject. The user can use the operation input unit 25 by sliding the panel cover 86 downward. The operation input unit 25 is provided with a cross-shaped cursor button 91 for moving set up items, a menu button 92 for changing set up menus, an enter button 93 for registering set up, and a back-light switch for turning on a back-light of the display unit 26. The user can perform various set up for the wireless camera 11 by confirming the contents displayed on the display unit 26 and operating the operation input unit 25.

Next, the contents of parameters set up by the wireless camera 11 using the operation input unit 25 will be explained.

Figure 14:
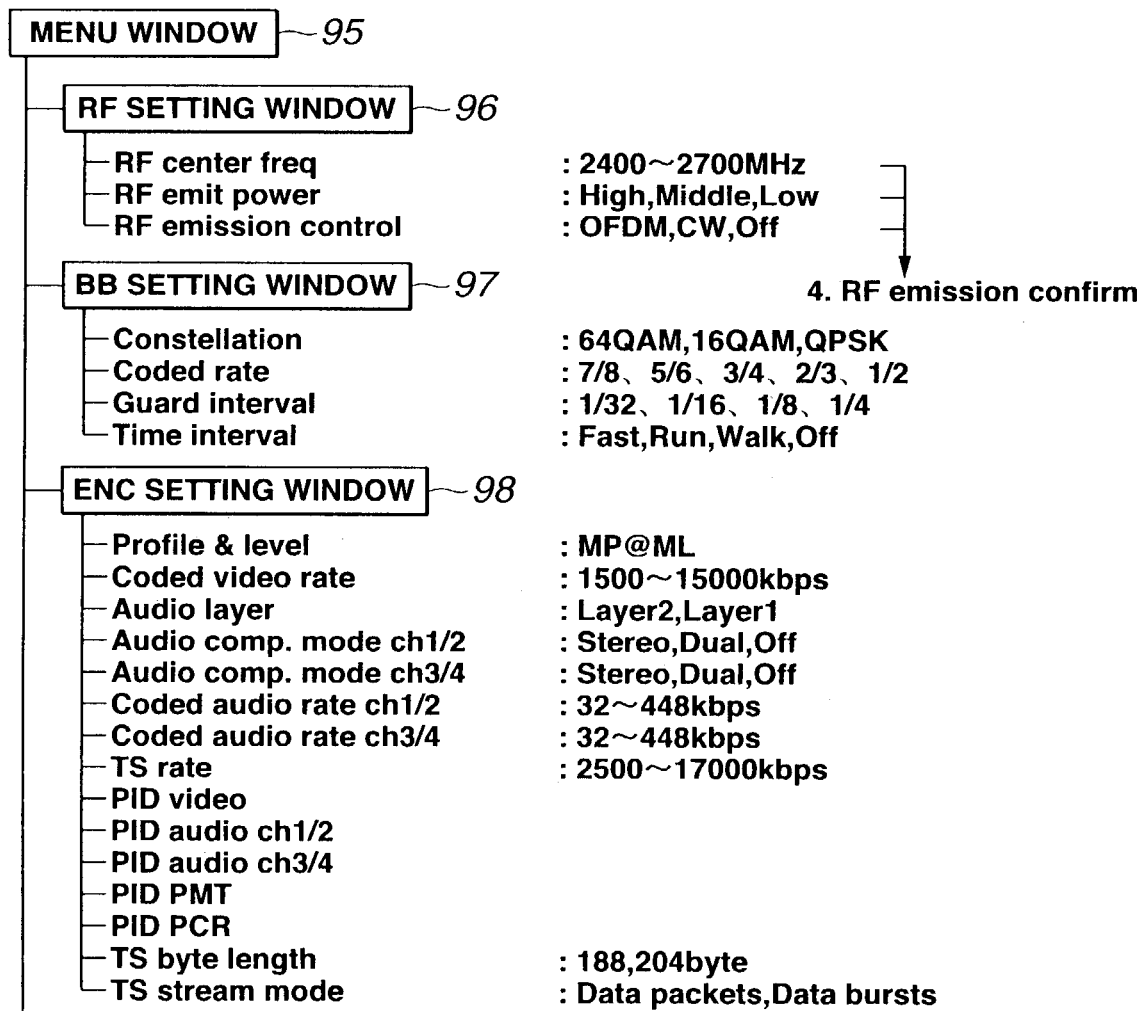
FIG. 14 shows a directory structure of set up items of the wireless camera.

As the parameter set up items which are set up by the operation input unit 25, there are generally parameter set up for RF signals, parameter set up for baseband signals, and parameter set up for encoding transport streams. These parameter set up items are displayed on the display unit 26 in the form of a directory structure, as shown in FIG. 14. Specifically, at first, a menu window 95 as a menu screen is displayed. Then the screen can be moved to detailed parameter set up screens of respective parameter set up items by selecting an RF setting window 96 as a parameter set up screen for RF signals, a BB setting window 97 as a parameter set up screen for baseband signals, or an ENC setting window 98 as a parameter set up screen for encoding transport streams, from the menu window 95.

As the set up items for RF signals of the RF setting window 96, there are set up for RF signals center frequency (RF center freq), set up for RF signals emitting power (RF emit power), set up for RF signals emission control (RF emission control), and set up for RF signals emission confirmation (RF emission confirm). In performing set up for RF center freq, a center frequency of from 2,400 to 2,700 MHz can be selected. In performing set up for RF emit power, power of three stages of High, Middle, or Low can be selected. In performing set up for RF emission control, OFDM, CW, or OFF can be selected.

As the set up items for baseband signals of the BB setting window 97, there are set up for digital modulation manner of baseband signals (Constellation), set up for transmission code rate (Code rate), set up for guard interval length of OFDM modulation (Guard interval), and set up for time interleave amount at the time of transmission-line-encoding (Time interleave). In performing set up for Constellation, as a digital orthogonal modulation manner, 64 QAM, 16 QAM, or QPSK can be selected. In performing set up for Code rate, as a code rate, 7/8, 5/6, 3/4, 2/3, or 1/2 can be selected. In performing set up for Guard interval, as a guard interval length, 1/32, 1/16, 1/8, or 1/4 can be selected. In performing set up for Time interleave, as a delay amount of time interleave, four stages of Fast (largest delay amount), Run, Walk, or Off (no delay) can be selected.

As the set up items for encoding transport streams of the ENC setting window 98, there are set up for profile and level (Profile & level), set up for video signals coded rate (Coded video rate), set up for audio layer (Audio layer), set up for first audio signals component mode (Audio comp. mode ch 1/2), set up for second audio signals component mode (Audio comp. mode ch 3/4), set up for first audio signals coded rate (Coded audio rate ch 1/2), set up for second audio signals coded rate (Coded audio rate ch 3/4), set up for transport streams coded rate (TS rate), set up for PID of TS packets including video signals (PID video), set up for PID of TS packets including first audio signals (PID audio ch 1/2), set up for PID of TS packets including PMT (PID PMT), set up for PID of TS packets of PCR (PID PCR), set up for 1 packet byte length (TS byte length), and set up for transport streams transmission mode (TS Stream mode).

In performing set up for Profile & level, profile and level is set up and fixed at MP@ML. In performing set up for Coded video rate, a coded rate of from 1,500 to 15,000 kbps can be selected. In performing set up for Audio layer, compression mode of MPEG 1 audio layer 1 or MPEG 1 audio layer 2 can be selected. In performing set up for Audio comp. mode ch 1/2, as the contents of a first audio signal component, Stereo, Dual, or Off can be selected. In performing set up for Audio comp. mode ch 3/4, as the contents of a second audio signal component, Stereo, Dual, or Off can be selected. In performing set up for Coded audio rate ch 1/2, a coded rate of from 32 to 448 kbps can be selected. In performing set up for Coded audio rate ch 3/4, a coded rate of from 32 to 448 kbps can be selected. In performing set up for TS rate, a coded rate of transport streams of from 2,500 to 17,000 kbps can be selected. In performing set up for TS byte length, a byte length of 188 bytes or 204 bytes can be selected. In performing TS Stream mode, packet transmission or burst transmission can be selected.

Figure 15:
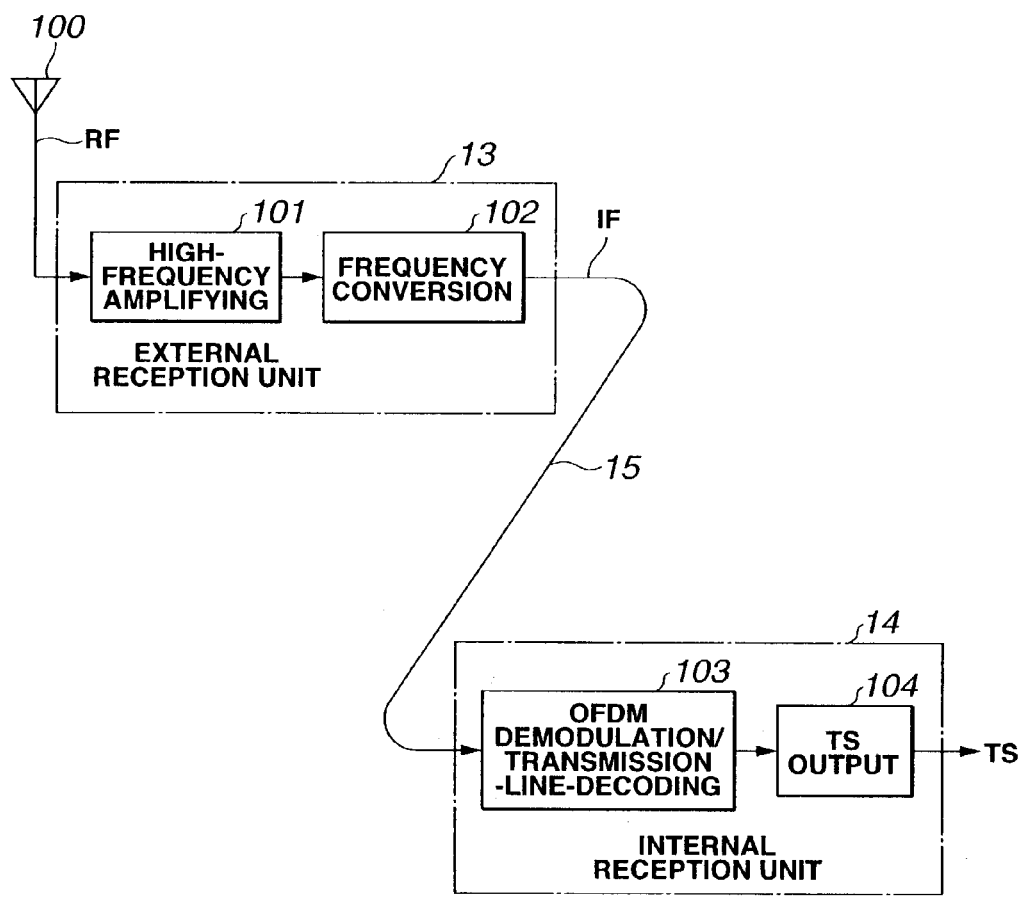
FIG. 15 shows a block diagram of a reception relay station.

Next, referring to FIG. 15, configuration of the reception relay station 12 will be explained in detail.

As has been described, the reception relay station 12 includes the external reception unit 13, the internal reception unit 14, and the plural IF cables 15 which connects the external reception unit 13 and the internal reception unit 14.

The external reception unit 13 includes a reception antenna 100, a high-frequency amplifier 101, and a frequency converter 102. On the other hand, the internal reception unit 14 includes an OFDM demodulation/transmission-line-decoding circuit 103, and a TS output unit 104.

The reception antenna 100 receives transmission waves transmitted from the wireless camera 11, and send thus received RF signals to the high-frequency amplifier 101.

The high-frequency amplifier 101 high-frequency-amplifies RF signals received by the reception antenna 100, and high-frequency-amplified RF signals are sent to the frequency converter 102.

The frequency converter 102 down-converts carrier frequency of high-frequency-amplified RF signals to generate IF signals.

Thus, the external reception unit 13 receives transmission waves transmitted from the wireless camera 11 using the reception antenna 100, and frequency-converts received RF signals to IF signals of an intermediate frequency band. IF signals output from the external reception unit 13 is supplied to the OFDM demodulation/transmission-line-decoding circuit 103 in the internal reception unit 14 via the IF cables 15.

The OFDM demodulation/transmission-line-decoding circuit 103 performs channel selection and orthogonal demodulation for received IF signals. Also, the OFDM demodulation/transmission-line-decoding circuit 103 performs synchronization processing such as FFT window synchronization and symbol timing synchronization, while concurrently performing OFDM demodulation such as orthogonal transformation for performing FFT (Fast Fourier Transform) processing every effective symbol to generate frequency-domain OFDM signals, waveform equalization, and demapping to demodulate transmission data. Furthermore, the OFDM demodulation/transmission-line-decoding circuit 103 performs transmission-line-decoding for demodulated transmission data such as symbol deinterleaving, bit deinterleaving, inner code decoding, convolutional deinterleaving, and RS decoding, to decode transport streams. Decoded transport streams are sent to the TS output unit 104.

The TS output unit 104 performs smoothing for transport streams sent from the OFDM demodulation/transmission-line-decoding circuit 103.

Thus, the internal reception unit 14 performs channel selection for selecting predetermined frequency from received IF signals, and OFDM demodulation/transmission-line-decoding, to decode transport streams transmitted from the wireless camera 11. Transport streams output from the internal reception unit 14 are transmitted to a broadcasting station, and information thereof is processed and delivered to viewers.

Next, OFDM demodulation/transmission-line-decoding will be explained in detail.

Figure 16:
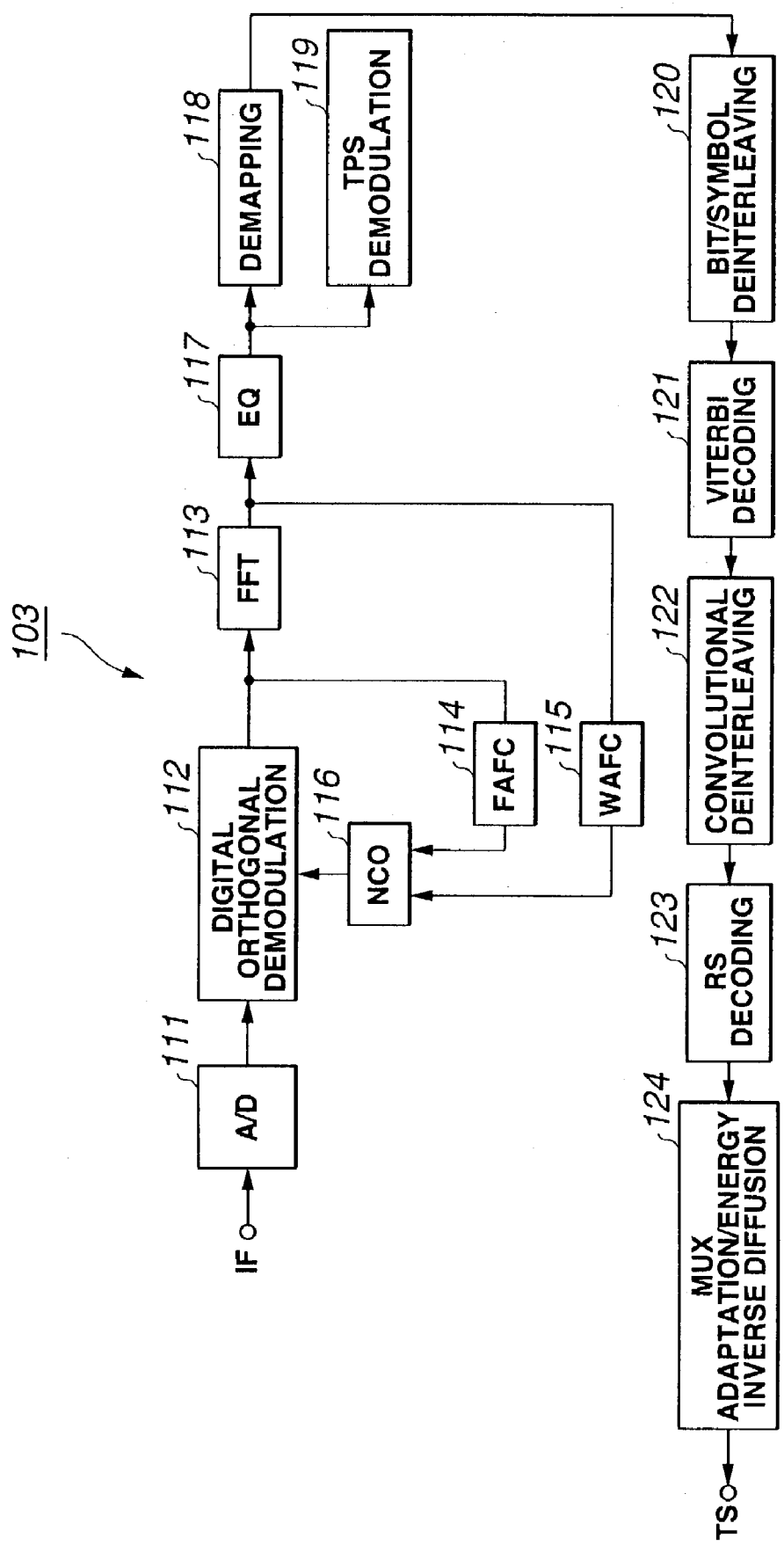
FIG. 16 shows a block diagram of an OFDM demodulation/transmission-line-decoding circuit in the reception relay station.

Referring to FIG. 16, internal circuit configuration of the OFDM demodulation/transmission-line-decoding circuit 103 in the internal reception unit 14 will be explained in detail.

As shown in FIG. 16, the OFDM demodulation/transmission-line-decoding circuit 103 includes an A/D converter 111, a digital orthogonal demodulation circuit 112, an FFT operation circuit 113, a narrow-band fc error calculation (FAFC) circuit 114, a broad-band fc error calculation (WAFC) circuit 115, a numeric control oscillation (NCO) circuit 116, an equalizer 117, a demapping circuit 118, a Transmission Parameter Signaling (TPS) demodulation circuit 119, a bit/symbol deinterleaving circuit 120, a viterbi decoding circuit 121, a convolutional deinterleaving circuit 122, a reed solomon decoding circuit 123, and a MUX adaptation/energy inverse diffusion circuit 124.

IF signals supplied from the external reception unit 13 via the IF cables 15 are sent to the A/D converter 111.

The A/D converter 111 digitizes IF signals. Digitized IF signals are sent to the digital orthogonal demodulation circuit 112. The A/D converter 111 performs quantization using double clock such that effective symbol and guard interval of OFDM time-domain signals are sampled by 4,096 samples and 1,024 samples, respectively.

The digital orthogonal demodulation circuit 112 performs orthogonal demodulation for digitized IF signals using a carrier signal of a predetermined frequency (carrier frequency) to generate baseband OFDM signals. Baseband OFDM signals sent from the digital orthogonal demodulation circuit 112 are time-domain signals before being processed under FFT operation. So, baseband signals to be processed by FFT operation, which have been processed under digital orthogonal demodulation are referred to as OFDM time-domain signals, hereinafter. The OFDM time-domain signals become complex signals having real axis components (I channel signals) and imaginary axis components (Q channel signals) after being processed under orthogonal demodulation.

The OFDM time-domain signals sent from the digital orthogonal demodulation circuit 112 are sent to the FFT operation circuit 113 and the narrow-band fc error calculation circuit 114.

The FFT operation circuit 113 performs FFT operation for the OFDM time-domain signals, and extracts and outputs data which is orthogonal-modulated to respective subcarriers. Signals sent from the FFT operation circuit 113 are frequency-domain signals after being processed under FFT operation. So, signals which have been processed under FFT operation are referred to as OFDM frequency-domain signals, hereinafter.

The FFT operation circuit 113 extracts signals in the range of effective symbol length of such as 2,048 samples from one OFDM symbol, or excludes signals in the range of guard interval from one OFDM symbol, and performs FFT operation for extracted 2048-sample OFDM time-domain signals. Specifically, the start point of the operation is between the boundary of OFDM symbol and the end of guard interval. The operation range is referred to as FFT window.

So, the OFDM frequency-domain signals sent from the FFT operation circuit 113 become, similar to the OFDM time-domain signals, complex signals having real axis components (I channel signals) and imaginary axis components (Q channel signals). The OFDM frequency-domain signals are sent to the broad-band fc error calculation circuit 115 and the equalizer 117.

The narrow-band fc error calculation circuit 114 calculates carrier frequency error included in the OFDM time-domain signals. Specifically, the narrow-band fc error calculation circuit 114 calculates narrow-band carrier frequency error with precision of under ±1/2 of frequency interval of subcarriers. Carrier frequency error is center frequency position error of the OFDM time-domain signals, which is generated due to gap of reference frequency output from a local oscillator of the frequency converter 102, and error ratio of output data is enlarged as the carrier frequency error increases. Narrow-band carrier frequency error obtained by the narrow-band fc error calculation circuit 114 is sent to the NCO circuit 116.

The broad-band fc error calculation circuit 115 calculates carrier frequency error included in the OFDM time-domain signals. Specifically, the broad-band fc error calculation circuit 115 calculates broad-band carrier frequency error with precision of frequency interval of subcarriers. The broad-band fc error calculation circuit 115 obtains a shift amount by referring to a continual pilot signal (CP signal) and calculates the shift degree of the CP signal from the original insertion point thereof. Broad-band carrier frequency error obtained by the broad-band fc error calculation circuit 115 is sent to the NCO circuit 116.

The NCO circuit 116 sums up narrow-band carrier frequency error with precision of under ±1/2 of frequency interval of subcarriers calculated by the narrow-band fc error calculation circuit 114 and broad-band carrier frequency error with precision of frequency interval of subcarriers calculated by the broad-band fc error calculation circuit 115, and generates carrier frequency error correction signals, which frequency increases and decreases in accordance with summed up carrier frequency error. The carrier frequency error correction signals are complex signals, and are sent to the digital orthogonal demodulation circuit 112. The carrier frequency error correction signals correct carrier frequency fc based on the carrier frequency error correction signals, while performing digital orthogonal demodulation.

The equalizer 117 performs phase equalization and amplitude equalization for the OFDM frequency-domain signals using a scattered pilot signal (SP signal). The OFDM frequency-domain signals which have been processed under phase equalization and amplitude equalization are sent to the demapping circuit 118 and the TPS demodulation circuit 119.

The TPS demodulation circuit 119 separates TPS signals allocated to predetermined frequency component, and demodulate information of code rate, modulation manner, and guard interval length from the separated TPS signals.

The demapping circuit 118 performs demapping for the OFDM frequency-domain signals which have been processed under phase equalization and amplitude equalization by the equalizer 117 in accordance with the modulation manner thereof. Data which has been processed under demapping is sent to the bit/symbol deinterleaving circuit 120.

The bit/symbol deinterleaving circuit 120 performs the opposite processing of bit interleaving and symbol interleaving which are performed at the transmission-line-encoding/OFDM modulation circuit 44. Data which has been processed under bit deinterleaving and symbol deinterleaving is sent to the viterbi decoding circuit 121.

The viterbi decoding circuit 121 performs maximum likelihood decoding using viterbi algorithm. Data which has been processed under maximum likelihood decoding is sent to the convolutional deinterleaving circuit 122.

The convolutional deinterleaving circuit 122 performs the opposite processing of convolutional interleaving which is performed at the transmission-line-encoding/OFDM modulation circuit 44. Data which has been processed under convolutional deinterleaving is sent to the reed solomon decoding circuit 123.

The reed solomon decoding circuit 123 performs reed solomon decoding based on parity of 16 bytes which is added to input data series at the transmission-line-encoding/OFDM modulation circuit 44, and corrects error if error is detected. Data which has been processed under reed solomon decoding is sent to the MUX adaptation/energy inverse diffusion circuit 124.

The MUX adaptation/energy inverse diffusion circuit 124 keep synchronization byte of leading 1 byte of TS packets intact in case the synchronization byte is 47h, while, in case the synchronization byte is B8h, performing bit inversion to correct the synchronization byte from B8h to 47h. At this time, the MUX adaptation/energy inverse diffusion circuit 124 simultaneously initializes a shift-register for generating pseudorandom binary sequence (PRBS) which is used in performing energy diffusion every TS packet whose synchronization byte is B8h by predetermined seed value. For example, the PRBS series is $(x^{15}+x^{14}+1)$, and seed value is 009Ah. The MUX adaptation/energy inverse diffusion circuit 124 performs energy inverse diffusion by operating exclusive OR of data of TS packets excluding synchronization byte (1 byte) and PRBS. Data series which have been processed under energy inverse diffusion are sent to the TS output unit 104 as transport streams.

Thus configured radio relay system 1 can be applied to such as a golf relaying, marathon relaying, concert relaying, stadium relaying of soccer, baseball, athletic sports, etc., interview relaying of news, monitoring of a fire station or police station, school broadcasting, and security management.

Figure 17:
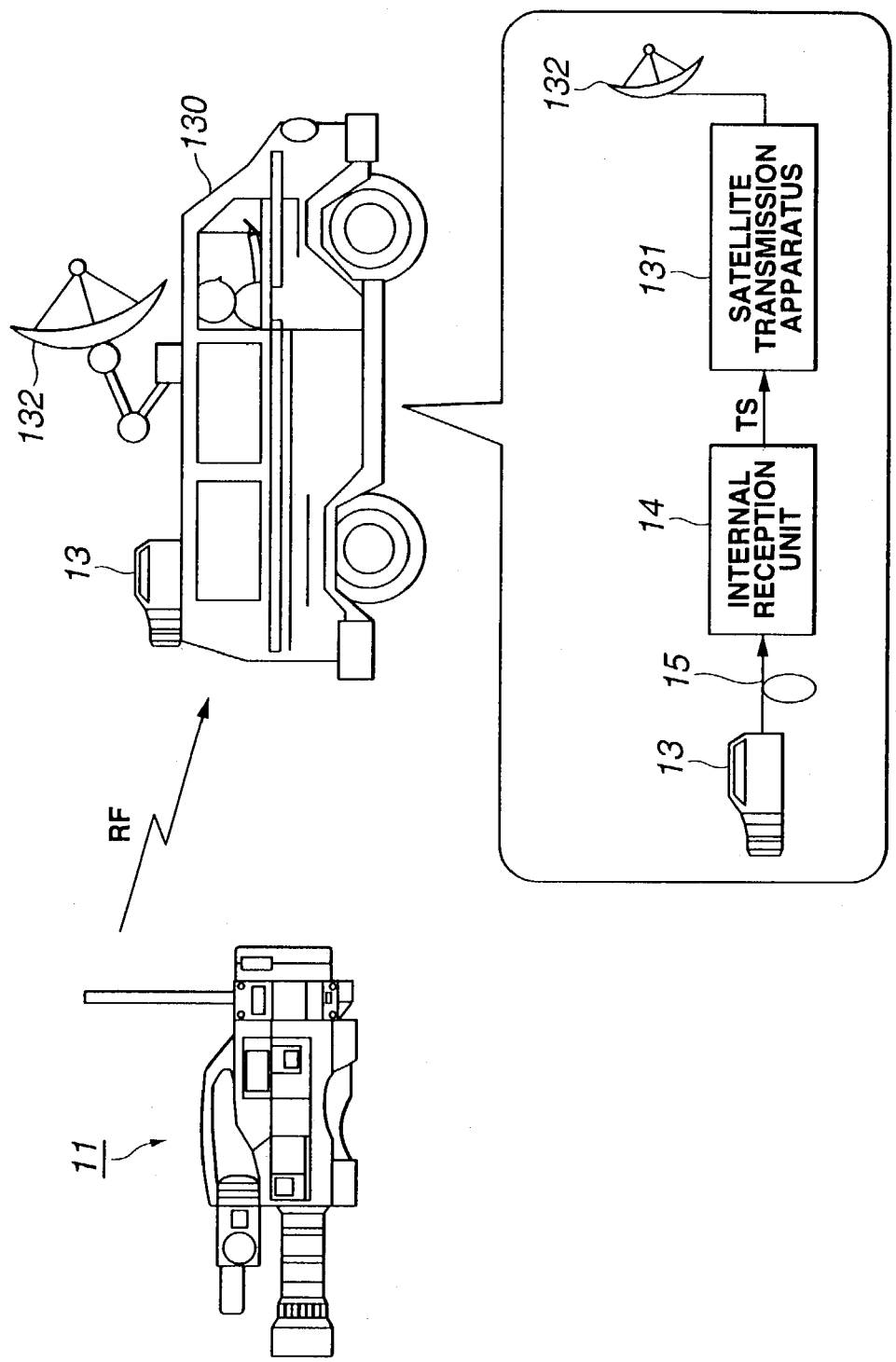
FIG. 17 shows an application example of the radio relay system.
Figure 18:
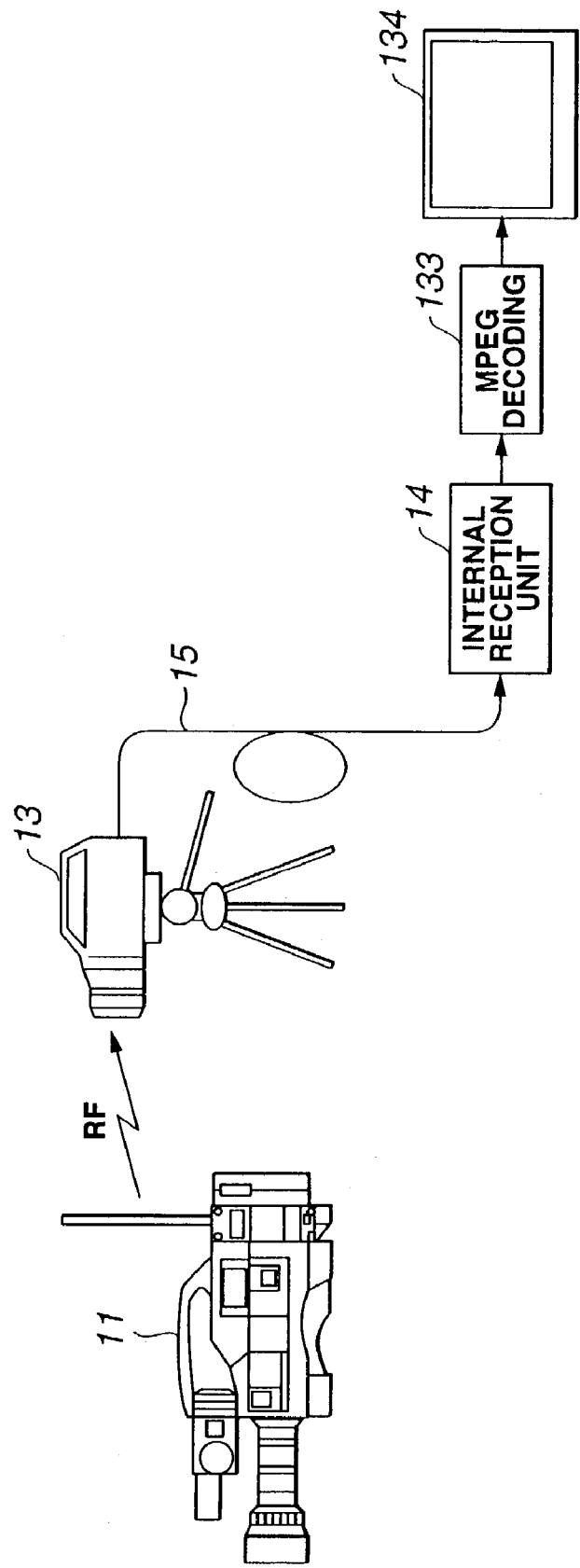
FIG. 18 shows another application example of the radio relay system.

In case of applying the radio relay system 1 to outdoor shooting such as a golf relaying and marathon relaying, extensive range shooting becomes possible when the reception relay station 12 is mounted to a relay car 130, as shown in FIG. 17. In this case, a satellite transmission apparatus 131 and a parabolic antenna 132 is mounted to the relay car 130, and transport streams output from the internal reception unit 14 are transmitted to a broadcasting station via a satellite line. On the other hand, in case of applying the radio relay system 1 to monitoring of a fire station or police station, and security management, an MPEG decoder 133 and a monitor 134 is prepared, and transport streams output from the internal reception unit 14 are decoded and displayed by the monitor 134, as shown in FIG. 18.

Furthermore, in case of applying the radio relay system 1 to a golf relaying, the wireless camera 11 can be used as a player camera, multi-camera, or gallery camera. Also, in case of applying the radio relay system 1 to a marathon relaying, the wireless camera 11 can be used as a motorcycle camera, relay car camera, or roadside camera. Also, in case of applying the radio relay system 1 to a concert relaying, the wireless camera 11 can be used as a live video camera, or audience camera. Also, In case of applying the radio relay system 1 to a stadium relaying, the wireless camera 11 can be used as a camera for ground level shooting. Also, In case of applying the radio relay system 1 to an interview relaying of news, the wireless camera 11 can be used as a camera for use in the place where cables cannot be arranged. Also, in case of applying the radio relay system 1 to monitoring of a fire station or police station, since real time transmission becomes possible, immediacy or instancy can be achieved.

As in the above, according to the present invention, the radio relay system 1 has the pick up unit 21, the video encoding circuit 37, the transmission-line-encoding/OFDM modulation circuit 44, the transmission unit 24, and the battery unit 18 housed in a housing or a unitable housing.

So, the wireless camera 11 can be operated by one operator without the need of help of an assistant.

INDUSTRIAL APPLICABILITY

The wireless camera according to the present invention has the pick up means, the encoding means, the modulation means for performing orthogonal frequency-division-multiplex modulation, the transmission means, and the antenna housed in a housing or a unitable housing.

So, the wireless camera according to the present invention can be operated by one operator.

The invention claimed is:

1. A wireless camera, comprising:
    pick up means;
    encoding means for encoding video signals picked up by the pick up means to generate transmission data of a predetermined encoding system;
    modulation means for orthogonal frequency-division-multiplex modulating the transmission data encoded by the encoding means;
    transmission means for frequency-converting modulated signals generated by the modulation means into signals of a radio frequency band, and radiating frequency-converted signals via an antenna;
    battery means; and
    first housing means for housing the encoding means and the transmission means wherein the first housing means comprises:
        first connecting means for removably connecting a first portion of the pick up means to a first portion of the first housing means;
        second connecting means for removably connecting a second portion of the pick up means to a second portion of the first housing means;

third connecting means for removably connecting the first housing to the battery means; and fourth connecting means for removably connecting the first housing to a transmission antenna;

wherein the pick up means, the encoding means, the modulation means, and the transmission means are housed in a second housing.

2. The wireless camera according to claim 1, wherein the first connecting means comprises one or more protruding members adapted to interface with one or more corresponding recessed portions of the pick up means.

3. The wireless camera according to claim 1, wherein the second connecting means comprises a substantially wedged-shaped portion adapted to interface with the pick up means in a substantially interference relationship.

* * * * *